(12) United States Patent
Kim et al.

(10) Patent No.: US 8,165,567 B2
(45) Date of Patent: *Apr. 24, 2012

(54) METHOD AND SYSTEM FOR CUSTOMIZING USER INTERFACE BY EDITING MULTIMEDIA CONTENT

(75) Inventors: Jongbae Kim, Seoul (KR); Hoojong Kim, Seoul (KR)

(73) Assignee: SK Telecom Co., Ltd., Seoul (KR)

( * ) Notice: Subject to any disclaimer, the term of this patent is extended or adjusted under 35 U.S.C. 154(b) by 1231 days.

This patent is subject to a terminal disclaimer.

(21) Appl. No.: 11/909,930

(22) PCT Filed: Sep. 7, 2006

(86) PCT No.: PCT/KR2006/003561
§ 371 (c)(1),
(2), (4) Date: Sep. 27, 2007

(87) PCT Pub. No.: WO2007/029975
PCT Pub. Date: Mar. 15, 2007

(65) Prior Publication Data
US 2008/0214147 A1    Sep. 4, 2008

(30) Foreign Application Priority Data
Sep. 7, 2005    (KR) .................. 10-2005-0083334

(51) Int. Cl.
*H04M 3/42* (2006.01)
(52) U.S. Cl. ............... 455/414.1; 348/14.01; 348/14.02
(58) Field of Classification Search .................. 700/700; 455/433, 414.1
See application file for complete search history.

(56) References Cited

U.S. PATENT DOCUMENTS

| 6,909,878 | B2 | 6/2005 | Haller et al. | |
|---|---|---|---|---|
| 7,636,889 | B2* | 12/2009 | Weber et al. | 715/723 |
| 2001/0014976 | A1* | 8/2001 | Roop et al. | 725/91 |
| 2004/0031058 | A1* | 2/2004 | Reisman | 725/112 |
| 2004/0163090 | A1* | 8/2004 | Ledru et al. | 719/320 |
| 2004/0201603 | A1* | 10/2004 | Kalish | 345/700 |
| 2004/0220943 | A1 | 11/2004 | Ross et al. | |
| 2005/0154796 | A1* | 7/2005 | Forsyth | 710/1 |
| 2006/0014493 | A1 | 1/2006 | Haller et al. | |
| 2006/0025132 | A1* | 2/2006 | Karaoguz et al. | 455/433 |
| 2006/0206590 | A1* | 9/2006 | Wakasa et al. | 709/219 |
| 2006/0230427 | A1* | 10/2006 | Kunkel et al. | 725/133 |

(Continued)

FOREIGN PATENT DOCUMENTS

CN    1571569    1/2005

(Continued)

OTHER PUBLICATIONS

Chinese Office Action dated Apr. 26, 2011 for 2006-80023630.4, citing the above reference(s).

(Continued)

*Primary Examiner* — Marcos Batista
(74) *Attorney, Agent, or Firm* — Lowe Hauptman Ham & Berner LLP

(57) ABSTRACT

Disclosed is a method and a system for customizing a user interface by editing multimedia content, in which, when a user customizes the user interface displayed on a mobile communication terminal according to the preference of the user, the user edits the multimedia content to be used for the user interface, and uses the edited multimedia content for the user interface.

6 Claims, 4 Drawing Sheets

U.S. PATENT DOCUMENTS

| | | | |
|---|---|---|---|
| 2006/0248570 A1* | 11/2006 | Witwer | 725/135 |
| 2007/0038934 A1* | 2/2007 | Fellman | 715/700 |
| 2007/0174415 A1* | 7/2007 | Cha et al. | 709/217 |
| 2007/0232292 A1* | 10/2007 | Larocca | 455/425 |

FOREIGN PATENT DOCUMENTS

| | | |
|---|---|---|
| KR | 10-2004-0097642 | 11/2004 |
| KR | 10-2004-0006883 | 12/2004 |
| KR | 10-2002-0001979 | 10/2006 |
| WO | 99/29109 | 6/1999 |
| WO | 03/060699 | 7/2003 |

OTHER PUBLICATIONS

Chinese Office Action dated Jul. 27, 2011 for 200680023630.4, citing the above reference(s).

* cited by examiner

METHOD AND SYSTEM FOR CUSTOMIZING USER INTERFACE BY EDITING MULTIMEDIA CONTENT

CROSS REFERENCE TO RELATED APPLICATION

This application is the National Phase application of International Application No. PCT/KR2006/003561, filed Sep. 7, 2006, which designates the United States and was published in English. This application, in its entirety, is incorporated herein by reference.

TECHNICAL FIELD

The present invention relates to a method and system for customizing a user interface by editing multimedia content. Specifically, the present invention relates to a method and a system for customizing a user interface by editing multimedia content, in which, when a user customizes the user interface displayed on a mobile communication terminal according to the preference of the user, the user edits the multimedia content to be used for the user interface, and uses the edited multimedia content for the user interface.

BACKGROUND ART

Information communication technology, in which the Internet and mobile communication are the representative, has changed the life pattern of modern people. Personal Computers capable of accessing the Internet have been spread to most homes, schools and offices, so that information acquisition through web sites, product purchase through E-commerce, news exchange through E-mail, etc., have been implemented. Only a few years ago, people could use only a mobile communication service mainly for voice communication by using a mobile communication terminal. However, recently, a wireless Internet service has emerged, which can provide a mobile communication terminal with a data communication service using the Internet.

With the development of a mobile communication service as described above, a mobile communication terminal has also evolved into a mobile communication terminal equipped with various built-in devices such as camcorders, cameras and MP3 players from an early cellular phone mainly for voice communication. As a mobile communication terminal has various devices therein, the display device of the mobile communication terminal has also developed into a color display device from a black and white display device. Generally, the display device of a mobile communication terminal exists in order to inform a user of various state information of the mobile communication terminal, e.g. information such as the power supply level, the reception intensity of radio waves, and date and time.

As described above, with the development of information communication technology, a mobile communication terminal equipped with a color display device has been spread and a wireless Internet service has been generally used, which has resulted in the emergence of various content-providing businesses. Nowadays, a content-providing business (so called, a coloring service) has been highlighted, which provides still pictures and/or moving pictures to a mobile communication terminal in a communication standby state. A user interface displayed on a mobile communication terminal includes a background screen image, a menu configuration image, ring tone, effect sound, etc. In a conventional coloring service, only still pictures and/or moving pictures are provided by a content provider, but the ring tone, the effect sound, etc., are not provided.

Moreover, in the conventional coloring service, since the background screen image and the menu configuration image, which form the user interface of a mobile communication terminal, are integrally altered, a user cannot randomly customize the user interface according to the preference of the user. Furthermore, in the conventional coloring service, since only multimedia content generated as a package are provided from a content provider, it is impossible to edit the background screen image, the menu configuration image, the ring tone, the effect sound, etc., which are necessary for forming the user interface, according to the preference of the user.

DISCLOSURE OF THE INVENTION

Therefore, the present invention has been made in view of the above-mentioned problems, and it is an object of the present invention to provide a method and a system for customizing a user interface by editing multimedia content, in which, when a user customizes the user interface displayed on a mobile communication terminal according to the preference of the user, the user edits the multimedia content to be used for the user interface, and uses the edited multimedia content for the user interface.

According to one aspect of the present invention, there is provided a method for customizing a user interface by editing multimedia content, which customizes a user interface according to a preference of a user and changes the user interface by using a theme pack content, in a system including a wireless access network, a mobile communication network and a content-providing server, the wireless access network being a ground-based infrastructure for wirelessly exchanging data with a mobile communication terminal based on a predetermined protocol, having handoff and radio resource management functions, and relaying the theme pack service in which the user interface of the mobile communication terminal is altered according to the preference of the user, the mobile communication network being a set of communication equipment for providing voice telephone and data exchange services to a plurality of subscribers through a switching center, and relaying the theme pack service to the mobile communication terminal, the content-providing server providing the mobile communication terminal with a theme pack content corresponding to multimedia content necessary for using the theme pack service, the method comprising the steps of: (a) interworking with the content-providing server; (b) generating the theme pack content selectively formed according to the preference of the user through the content-providing server; (C) downloading the theme pack content; and (d) changing the user interface by using the theme pack content.

According to another aspect of the present invention, there is provided a system for customizing a user interface by editing multimedia content, which customizes a user interface according to a preference of a user and changes the user interface by using a theme pack content, in a system including a wireless access network and a mobile communication network, the wireless access network being a ground-based infrastructure for wirelessly exchanging data with a mobile communication terminal based on a predetermined protocol, having handoff and radio resource management functions, and relaying the theme pack service in which the user interface of the mobile communication terminal can be altered according to the preference of the user, the mobile communication network being a set of communication equipment for providing voice telephone and data exchange services to a plurality of subscribers through a switching center, and relaying the theme pack service to the mobile communication terminal, the system including a content-providing server for providing the mobile communication terminal with a theme pack content corresponding to multimedia content necessary for using the theme pack service.

BRIEF DESCRIPTION OF THE DRAWINGS

The foregoing and other objects, features and advantages of the present invention will become more apparent from the following detailed description when taken in conjunction with the accompanying drawings in which.

BEST MODE FOR CARRYING OUT THE INVENTION

Figure 1:
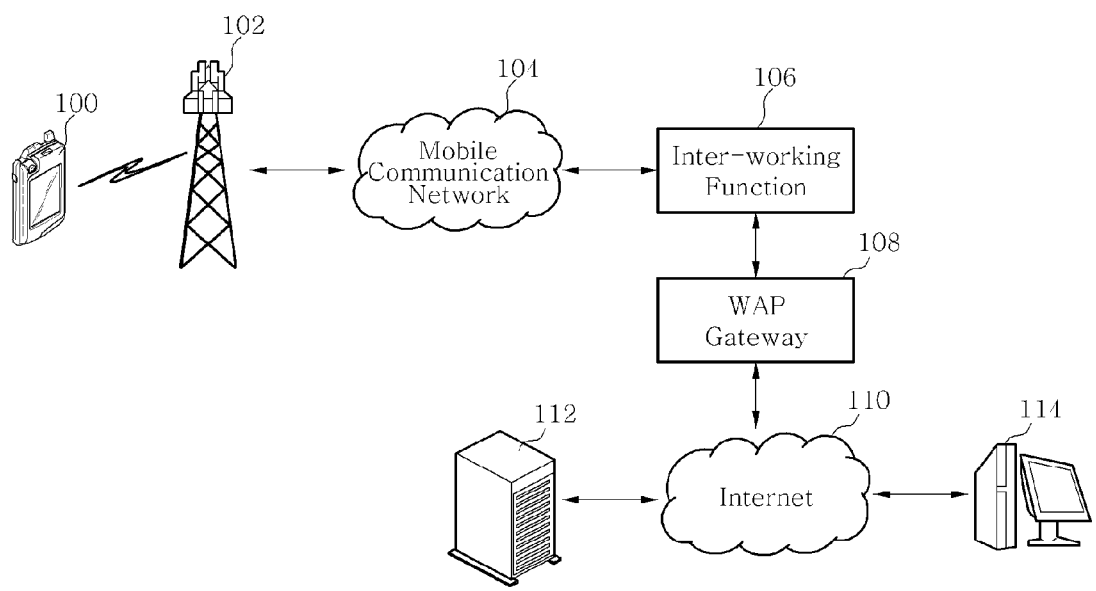
FIG. 1 is a block diagram schematically illustrating a system for customizing a user interface by editing multimedia content according to a preferred embodiment of the present invention.

Reference will now be made in detail to the preferred embodiment of the present invention. It should be noted that the similar components are designated by similar reference numerals although they are illustrated in different drawings. Also, in the following description, a detailed description of known functions and configurations incorporated herein will be omitted when it may obscure the subject matter of the present invention.

FIG. 1 is a block diagram schematically illustrating a system for customizing a user interface by editing multimedia content according to a preferred embodiment of the present invention.

The system for customizing the user interface by editing the multimedia content according to the preferred embodiment of the present invention includes a mobile communication terminal 100, a wireless access network 102, a mobile communication network 104, an inter-working function 106, a WAP gateway 108, the Internet 110, a content-providing server 112, and a wired/wireless terminal 114, among others.

Hereinafter, the main characteristics of the present invention will be described. First, the present invention is mainly characterized in that a user does not customize a user interface by accessing the content-providing server 112 through the mobile communication terminal 100, and automatically downloading multimedia content provided as a package from the content-providing server 112. In other words, the main characteristics of the present invention are that a user first selects and edits multimedia content (e.g. a background screen image, a menu configuration image, ring tone, effect sound, etc.) forming the user interface, and then downloads edited multimedia content, thereby customizing the user interface.

Further, a user does not only use the content-providing server 112 in generating multimedia content necessary for forming the user interface. That is, another characteristic of the present invention is that the user connects the mobile communication terminal 100 to the wired/wireless terminal 114 in a wired or wireless manner, and generates the multimedia content necessary for forming the user interface of the mobile communication terminal 100 by using multimedia content stored in the mobile communication terminal 100 or the wired/wireless terminal 114. Herein, it is assumed that the mobile communication terminal 100 and the wired/wireless terminal 114 equip themselves with an application for editing the multimedia content forming the user interface.

In the following description, for convenience of description, a mobile communication service, in which the user interface of the mobile communication terminal 100 is customized according to the preference of a user, will be defined as a "theme pack service". Further, multimedia content forming the user interface according to the preference of the user will be defined as a "theme pack content". Furthermore, a background screen image and a menu configuration image, which form the user interface displayed on the mobile communication terminal 100 before a configuration is altered according to the preference of a user, will be defined as the original background screen image and the original menu configuration image, respectively. A background screen image, in which a configuration is to be altered by using the theme pack content according to the preference of a user, will be defined as an alteration background screen image. In short, the main characteristics of the present invention are such that the original menu configuration image does not change even when the original background screen image changes according to the preference of a user, the alteration background screen image is employed as a background picture, the original menu configuration image overlaps with the alteration background screen image, and the overlapping portion is transparently or semi-transparently displayed. Of course, in another embodiment of the present invention, only the original menu configuration image may change without changing the original background screen image, or both the original background screen image and the original menu configuration image may also change for display.

The mobile communication terminal 100 denotes a communication terminal capable of using a web service in wire/wireless communication environments. That is, the mobile communication terminal 100 denotes a communication terminal having an interface manager that is an application necessary for using the theme pack service, and receiving the theme pack service through the content-providing server 112 or the wired/wireless terminal 114. In other words, the mobile communication terminal 100 denotes a communication terminal capable of accessing the mobile communication network 104 via the wireless access network 102, providing a voice communication function for performing typical voice communication with another mobile communication terminal in a wireless manner, generating the theme pack content by editing the multimedia content provided from the content-providing server 112 according to the preference of a user, and downloading the generated theme pack content to customize the user interface. Further, when the mobile communication terminal 100 has a camera function, and still and/or moving pictures generated by using the camera function exist, it is also possible to generate the theme pack content through the content-providing server 112 or the wired/wireless terminal 114.

The mobile communication terminal 100 accesses the Internet 110 via the mobile communication network 104 by using an Internet access browser such as a Wireless Application Protocol (WAP), which is an Internet access protocol, a Microsoft Internet Explorer (MIE) based on a HTML using a Hyper Text Transfer Protocol (HTTP), a Handheld Device Transport Protocol (HDTP), an i-mode of NTT DOCOMO, Inc., and a "NATE" of SK Telecom Co., Ltd., and interworks with the content-providing server 112 connected to the Internet 110. From among the Internet access protocols used by the mobile communication terminal 100, the MIE uses a language referred to as an m-HTML obtained by slightly modifying and abbreviating the HTML, and the i-mode uses a language referred to as a compact HTML (c-HTML) corresponding to the subset of the HTML.

The wireless access network 102 denotes a network endpoint equipment performing processing of baseband signals, wire/wireless conversion, transmission/reception of radio signals, etc., and is directly connected to the mobile communication terminal 100. That is, the wireless access network 102 is arranged by the cell, and transmits a communication request of the mobile communication terminal 100 existing in a cell area controlled by the wireless access network 102 to the mobile communication network 104, or performs position information registration for becoming aware of the position of the mobile communication terminal 100 existing in the cell area controlled by the wireless access network 102.

Further, the wireless access network 102 performs a relaying operation between the content-providing server 112 and the mobile communication terminal 100, and performs wireless channel assignment and release, determination of intercell soft handoff or hard handoff for the mobile communication terminal 100, transcoding and vocoding, Global Positioning System (GPS) clock distribution, management and maintenance for a base station, etc.

The mobile communication network 104 may correspond to a public switched telephone network managed by a mobile communication provider, denotes a set of communication equipment providing multiple subscribers with a voice telephone service or a data exchange service, and provides the mobile communication terminal 100 with a CDMA-2000 service, a WCDMA-2000 service, a portable Internet service, etc. The mobile communication network 104 performs processing of basic and supplementary services, processing of incoming and originating calls of a subscriber, processing of position registration and handoff procedures, an interworking function with another network, subscription and subscription release for the theme pack service, etc. The mobile communication network 104 of an IS-95 A/B/C system includes a subsystem such as an Interconnection Network Subsystem (INS) for performing a distributed call processing function, a Central Control Subsystem (CCS) for taking charge of a centralization function of operation and preservation, and a Location Registration Subsystem (LRS) for performing a storage and management function of information about mobile communication subscribers. Further, the mobile communication network 104 for 3 Generation (G) and 4G may include an Asynchronous Transfer Mode (ATM) switch (not shown) which improves transmission speed and the efficiency of a circuit use by transmitting packets by the cell.

The inter-working function 106 provides an interface for data exchange between a wireless communication system and a wired communication system, and converts protocols, signals and data in a form proper for each network. Generally, the inter-working function 106 connects the mobile communication network 104 to the Internet 110.

The WAP gateway 108 denotes software and hardware combined with the software for allowing packet data to be wirelessly exchanged between the mobile communication terminal 100 and the content-providing server 112 via the mobile communication network 104. The WAP gateway 108 performs processing of communication code conversion or protocol conversion, etc., between the mobile communication network 104 and the Internet 110 in order to rapidly search for and display information on the Internet, thereby connecting the mobile communication network 104 to the Internet 110. That is, the WAP gateway 108 interconverts a WAP protocol and an Internet TCP/IP protocol. Accordingly, data transmission/reception is performed between the content-providing server 112 and the WAP gateway 108, which are connected to the Internet 110, through an HTTP protocol, and data exchange is performed between the mobile communication terminal 100 and the WAP gateway 108 through the WAP protocol. The WAP gateway 108 converts a website address request from the mobile communication network 104 into an HTTP request according to the WAP protocol, and then transmits corresponding website address request signals to the content-providing server 112 through the Internet 110 according to the HTTP protocol. Further, the WAP gateway 108 converts various HTML content received from the content-providing server 112 into a binary code so that the mobile communication terminal 100 can recognize the content, and transmits the binary code to the mobile communication terminal 100. Herein, since data through the WAP gateway 108 is converted into a binary code, the amount thereof is reduced. Further, when the data is transmitted to the mobile communication network 104, the transmission load thereof is reduced.

In the above description, the WAP is the general term for a communication protocol enabling the use of the Internet 110 by using a wireless communication terminal such as the mobile communication terminal 100 and a personal digital assistant. In the WAP, data is converted into text codes on the Internet 110 and is then transferred to a wireless communication terminal, in order to solve the relatively slow communication speed problem of wireless communication. Further, the WAP is designed in consideration of content and wireless communication terminals, for which the WAP is to be used, so that users can use the Internet 110 only with a wireless terminal.

The Internet 110 denotes a communication network for providing an access path such that the mobile communication terminal 100 can transmit/receive packet data to/from the content-providing server 112.

11 The content-providing server 112 denotes software and hardware combined with the software for providing multimedia content including a background screen image, ring tone, effect sound, etc., which form the user interface of the mobile communication terminal 100, performing an edition for the background screen image, ring tone, effect sound, etc., according to the preference of a user, and providing the mobile communication terminal 100 with a theme pack content in the form of a package including the edited background screen image, ring tone, effect sound, etc. The mobile communication terminal 100 downloads the theme pack content from the wired/wireless terminal 114, changes the original background screen image, which forms the user interface of the mobile communication terminal 100, into an alteration background screen image by using the downloaded theme pack content, and transparently displays a portion overlapping with the original menu configuration image.

12 The wired/wireless terminal 114 denotes a communication terminal including a desk top computer, a Personal Digital Assistants (PDA), etc., which can access the Internet 110. The wired/wireless terminal 114 stores an interface manager that is an application necessary for using the theme pack service. Accordingly, a user connects the mobile communication terminal 100 to the wired/wireless terminal 114 in a wired or wireless manner, generates a theme pack content used for the theme pack service by using multimedia content stored in the mobile communication terminal 100 or the wired/wireless terminal 114, and downloads the generated theme pack content to the mobile communication terminal 100, thereby customizing the user interface according to the preference of the user.

Figure 2:
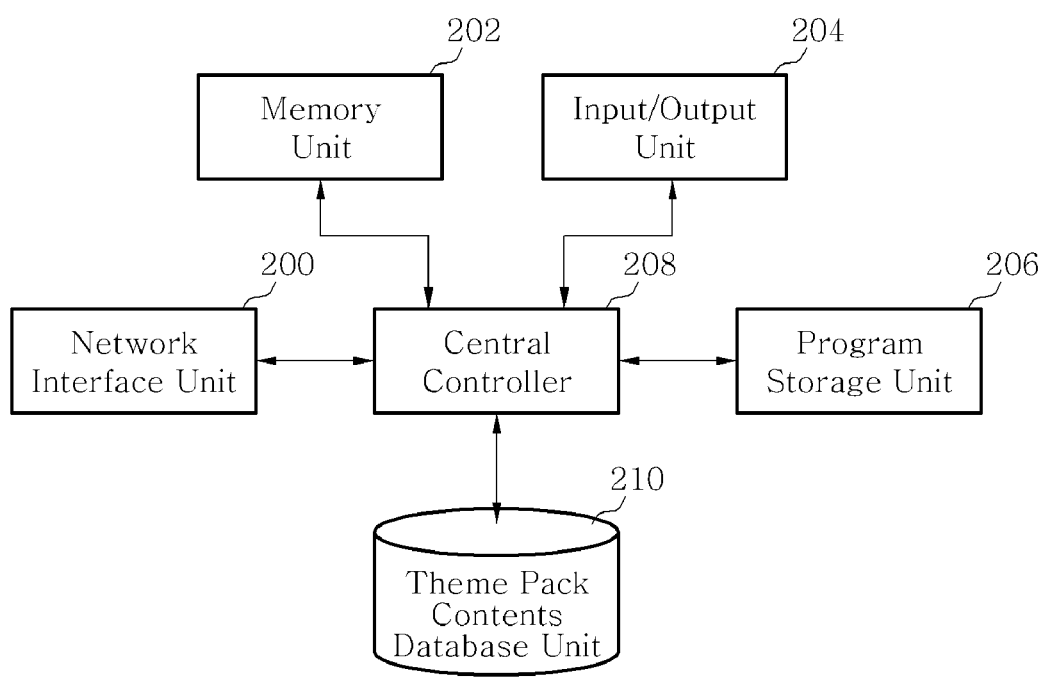
FIG. 2 is a block diagram schematically illustrating the internal construction of a content-providing server according to a preferred embodiment of the present invention.

FIG. 2 is a block diagram schematically illustrating the internal construction of the content-providing server according to the preferred embodiment of the present invention.

The content-providing server 112 according to the preferred embodiment of the present invention includes a network interface unit 200, a memory unit 202, an input/output unit 204, a program storage unit 206, a central controller 208, a theme pack content database unit 210, among others.

In the present invention, the content-providing server 112 provides the mobile communication terminal 100 with the multimedia content including the background screen image, ring tone, effect sound, etc., which are necessary for forming the user interface, and provides the mobile communication terminal 100 with the theme pack content generated from the multimedia content edited according to the preference of a user.

Further, the content-providing server 112 provides the mobile communication terminal 100 and the wired/wireless terminal 114 with an interface manager that is an application capable of generating the theme pack content necessary for using the theme pack service. Accordingly, a user can connect the mobile communication terminal 100 to the wired/wireless terminal 114 in a wired or wireless manner, and generate the theme pack content necessary for using the theme pack service, without accessing the content-providing server 112.

The network interface unit 200 interworks with the Internet 110, etc., and provides the mobile communication terminal 100 requesting the theme pack service with a communication interface necessary for providing the theme pack content.

The memory unit 202 temporarily stores data processed by the central controller 208, or temporarily stores data generated in a process of providing the mobile communication terminal 100 with the theme pack service. The input/output unit 204 displays the present processing status regarding the providing of the theme pack service, etc., as well as the present processing status according to key input.

The program storage unit 206 stores control software for executing a process of performing a service subscription procedure for the mobile communication terminal 100 intended for reception of the theme pack service and storing information of a user having completed the subscription procedure in the theme pack content database unit 210, a process of providing the mobile communication terminal 100 with list information of the multimedia content to be used for the theme pack service, a process of editing the multimedia content according to the preference of a user and generating the theme pack content from the edited multimedia content, a process of uploading the multimedia content stored in the mobile communication terminal 100 and allowing the uploaded the multimedia content to be used for generating the theme pack content necessary for forming the theme pack service.

The central controller 208 is a kind of central control unit, which controls a process by which the content-providing server 112 provides the theme pack service to the mobile communication terminal 100. That is, the central controller 208 executes the control software stored in the program storage unit 206, and transmits the theme pack content generated by the executed control software to the mobile communication terminal 100.

The theme pack content database unit 210 stores the interface manager that is software necessary for using the theme pack service, the multimedia content provided to the mobile communication terminal 100, etc. The multimedia content include the alteration background screen image, ring tone, effect sound, etc. The background screen image forms the background picture of the user interface of the mobile communication terminal 100. The ring tone forms the ring tone of the mobile communication terminal 100, and the effect sound forms the effect sound generated when the mobile communication terminal 100 executes an application.

Figure 3:
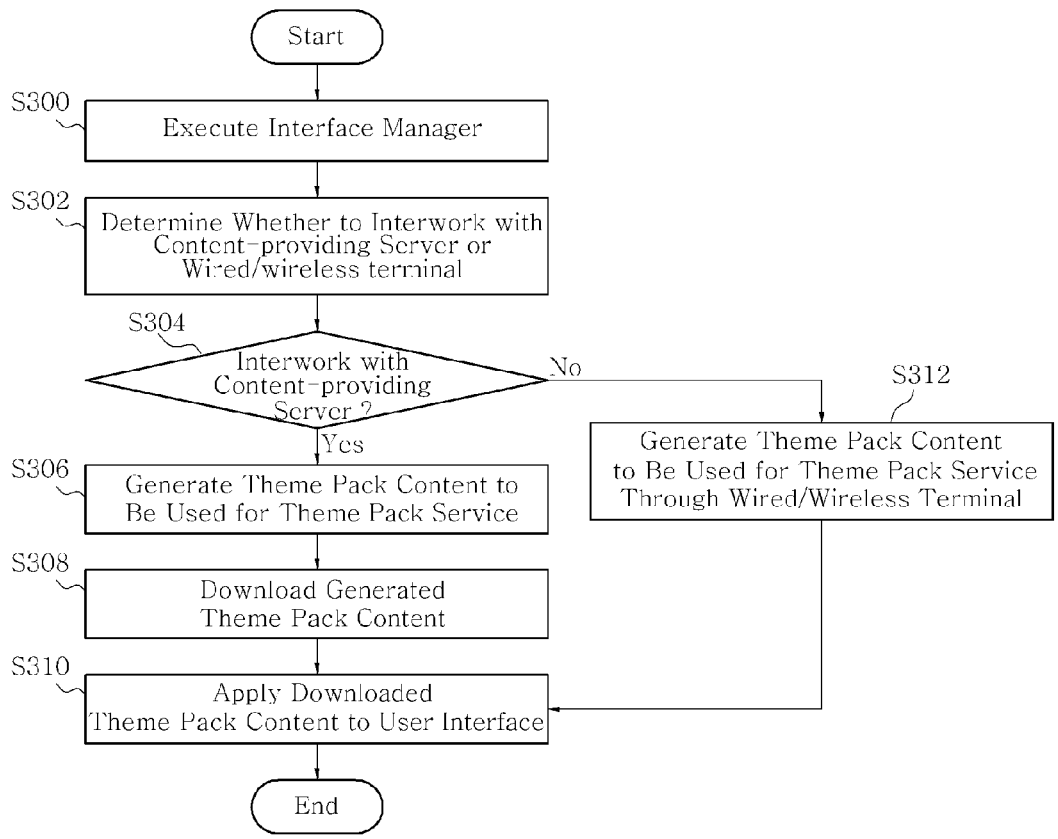
FIG. 3 is a flow diagram illustrating a process of customizing a user interface by editing multimedia content according to a preferred embodiment of the present invention.

FIG. 3 is a flow diagram illustrating a process of customizing a user interface by editing multimedia content according to the preferred embodiment of the present invention.

When a user is to use the theme pack service in which a user interface can be customized according to the preference of the user, the user operates a key input unit provided in the mobile communication terminal 100 so as to execute the interface manager (S300). Then, the user determines whether to interwork with the content-providing server 112 or the wired/wireless terminal 114 in order to use the theme pack service (S302).

In step 302, if the user determines to interwork with the content-providing server 112 (S304), the mobile communication terminal 100 interworks with the content-providing server 112 through a web browser provided therein, and then generates the theme pack content edited according to the preference of a user (S306).

The mobile communication terminal 100 downloads the theme pack content from the content-providing server 112 (S308). The mobile communication terminal 100 customizes the user interface through the interface manager, employs the alteration background screen image included in the downloaded theme pack content as a background picture, overlaps the original menu configuration image with the alteration background screen image, transparently processes the overlapping portion, and applies the ring tone, effect sound, etc., included in the theme pack content to the user interface (S310).

In step 302, if the user determines to interwork with the wired/wireless terminal 114 instead of the content-providing server 112, the mobile communication terminal 100 generates and downloads the theme pack content to be used for the theme pack service through the wired/wireless terminal 114 (S312).

Figure 4:
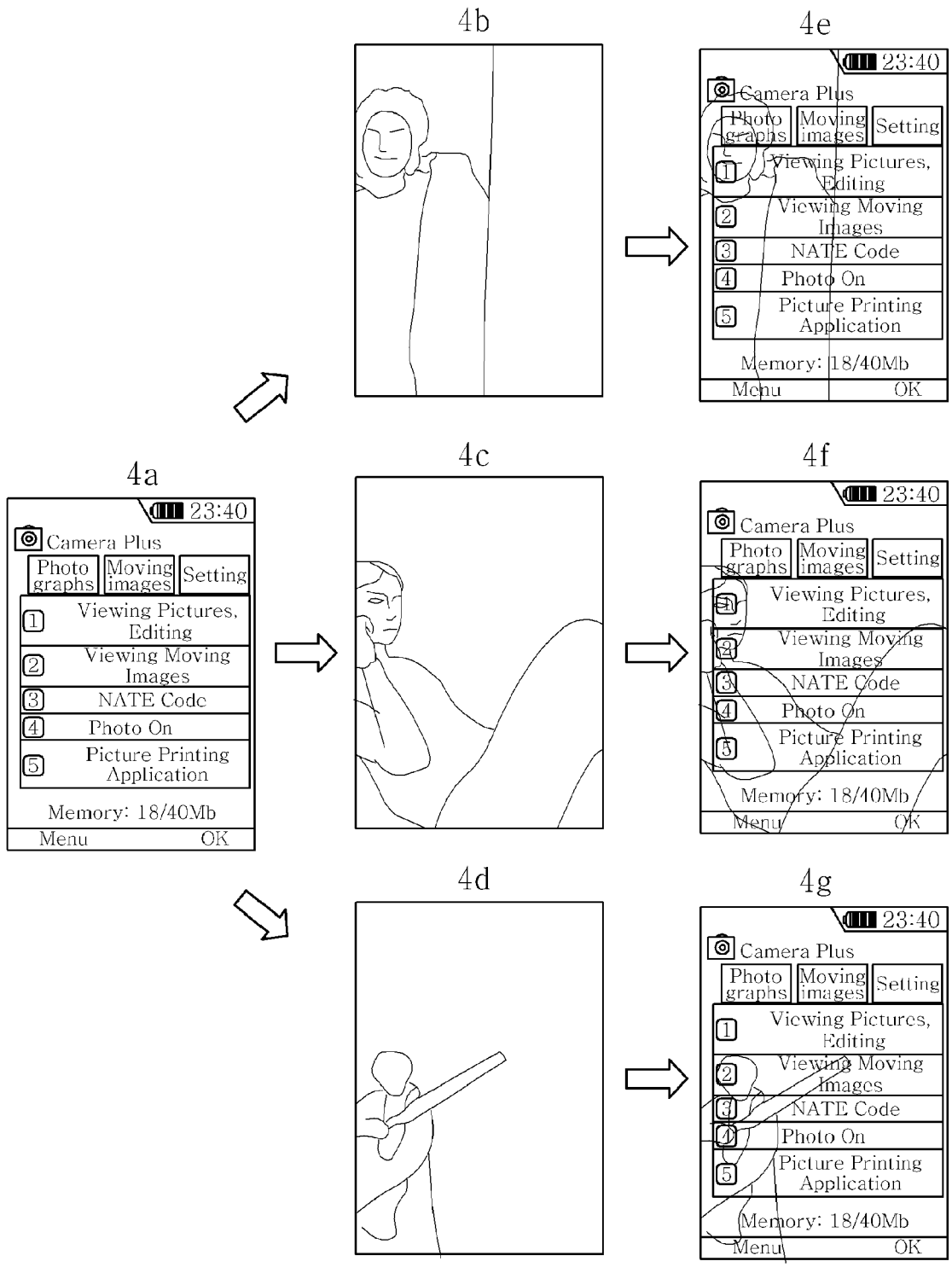
FIG. 4 is an exemplary diagram illustrating the screen of a mobile communication terminal customizing a user interface by editing multimedia content according to the preferred embodiment of the present invention.

FIG. 4 is an exemplary diagram illustrating the screen of the mobile communication terminal customizing a user interface by editing multimedia content according to the preferred embodiment of the present invention.

When a user is to change the configuration of a user interface according to the preference of the user, the user operates a key input unit provided in the mobile communication terminal 100 so as to execute the interface manager. Then, the mobile communication terminal 100 separates the original background screen image and the original menu configuration image from the currently displayed user interface as illustrated in FIG. 4A, and temporarily stores the separated original background screen image and original menu configuration image in the virtual area of the program storage (not shown) provided therein.

Then, the user selects the alteration background screen image of the user interface from the theme pack content edited according to the preference of the user, as illustrated in FIGS. 4B to 4D. The content-providing server 112 provides the mobile communication terminal 100 with the theme pack content including all or a portion of the multimedia content forming the alteration background screen image as illustrated in FIGS. 4B to 4D.

The mobile communication terminal 100 employs the alteration background screen image as a background picture, overlaps the alteration background screen image with the original menu configuration image temporarily stored in the virtual area of the program storage, and transparently processes and displays the overlapping portion as illustrated in FIGS. 4E to 4G.

While this invention has been described in connection with what is presently considered to be the most practical and preferred embodiment, it is to be understood that the present invention is not limited to the disclosed embodiment and the drawings, but, on the contrary, it is intended to cover various modifications and variations within the spirit and scope of the appended claims.

INDUSTRIAL APPLICABILITY

According to the present invention as described above, since it is possible to select a background screen image displayed on a mobile communication terminal according to the preference of a user, instead of receiving only multimedia content as a package from a content-providing server and integrally changing both a background screen image and a menu configuration image forming a user interface, users can display their individual preferences more freely.

Further, since a mobile communication provider, in which the ensuring of mobile communication subscribers determines the success or failure of a business, provides a differentiated service in saturated communication markets as compared to a rival company, it is possible to ensure an advantageous position in collecting new mobile communication subscribers.

The invention claimed is:

1. A method of customizing a user interface of a mobile communication terminal according to a user preference and a theme pack content, in a system including a wireless access network, a mobile communication network, and a content-providing server,
    the wireless access network being a ground-based infrastructure for wirelessly exchanging data with the mobile communication terminal based on a predetermined protocol and for relaying a theme pack service in which the user interface of the mobile communication terminal is capable of being altered according to the user preference,
    the mobile communication network including a set of communication equipment for providing voice telephone and data exchange services and for relaying the theme pack service to the mobile communication terminal,
    the content-providing server for providing the mobile communication terminal with the theme pack content corresponding to a multimedia content for using the theme pack service, the method comprising:
    (a) interworking with the content-providing server;
    (b) generating the theme pack content selectively formed according to the user preference through the content-providing server;
    (c) downloading the theme pack content; and
    (d) changing the user interface by using the theme pack content, including:
        (d1) separating an original background screen image and an original menu configuration image from the user interface, and temporarily storing separated original background screen image and original menu configuration image in a virtual area of a program storage provided in the mobile communication terminal;
        (d2) extracting an alteration background screen image from the theme pack content, overlapping the alteration background screen image with the original menu configuration image, and transparently processing an overlapping portion; and
        (d3) applying ring tone and effect sound included in the theme pack content to the user interface.

2. The method as claimed in claim 1, wherein the step (b) comprises:
    (b1) uploading the multimedia content stored in the mobile communication terminal for generation of the theme pack content; and
    (b2) editing the multimedia content provided in a finished product by a content provider according to the user preference, thereby generating the theme pack content.

3. The method as claimed in claim 1, wherein, in the method, only an original menu configuration image is altered using the theme pack content without altering an original background screen image forming the user interface, or both the original background screen image and the original menu configuration image are altered using the theme pack content for display.

4. A system for customizing a user interface, the system comprising:
    a mobile communication terminal having the user interface;
    a wireless access network being a ground-based infrastructure for wirelessly exchanging data with the mobile communication terminal based on a predetermined protocol and for relaying a theme pack service in which the user interface of the mobile communication terminal is capable of being customized according to a user preference;
    a mobile communication network including a set of communication equipment for providing voice telephone and data exchange services and for relaying the theme pack service to the mobile communication terminal; and
    a content-providing server for providing the mobile communication terminal with a theme pack content corresponding to a multimedia content for using the theme pack service,
    the mobile communication terminal being configured to generate the user interface, according to the theme pack content from the content-providing server, by separating an original background screen image and an original menu configuration image from the user interface, extracting an alteration background screen image from the theme pack content, and transparently processing an overlapped portion of the alternation background screen image and the original menu configuration image.

5. The system as claimed in claim 4, wherein the theme pack content includes all or a part of a background screen image, ring tone, or effect sound forming the user interface according to the preference of the user.

6. The system as claimed in claim 4, wherein the content-providing server generates the theme pack content by using the multimedia content uploaded through a wired/wireless terminal accessible to an Internet, transmits the generated theme pack content to the mobile communication terminal, and causes the user interface to be altered according to the user preference.

* * * * *